United States Patent
Yoo et al.

(10) Patent No.: US 10,093,172 B2
(45) Date of Patent: Oct. 9, 2018

(54) VEHICULAR ACTIVE AIR FLAP ASSEMBLY CAPABLE OF BEING OPENED OR CLOSED DURING FAILURE

(71) Applicant: Hyundai Motor Company, Seoul (KR)

(72) Inventors: Gil-Sang Yoo, Incheon (KR); Yang-Gi Lee, Suwon-si (KR); Jeong-Ho Lee, Suwon-si (KR); Choong-Yeul Kim, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/375,431

(22) Filed: Dec. 12, 2016

(65) Prior Publication Data

US 2018/0134145 A1    May 17, 2018

(30) Foreign Application Priority Data

Nov. 11, 2016  (KR) .......................... 10-2016-0150187

(51) Int. Cl.
*B60K 11/08*    (2006.01)
*B60K 11/06*    (2006.01)

(52) U.S. Cl.
CPC ............ *B60K 11/085* (2013.01); *B60K 11/06* (2013.01)

(58) Field of Classification Search
CPC ......... B60K 11/04; B60K 11/06; B60K 11/08; B60K 11/085
See application file for complete search history.

(56) References Cited

U.S. PATENT DOCUMENTS

| | | | | |
|---|---|---|---|---|
| 5,141,026 A | * | 8/1992 | Collette ............... | B60K 11/085 137/601.09 |
| 2003/0029852 A1 | * | 2/2003 | Ozawa ...................... | F01P 7/12 219/205 |
| 2012/0012410 A1 | * | 1/2012 | Hori ..................... | B60K 11/085 180/68.1 |
| 2013/0012115 A1 | * | 1/2013 | Schwarz .............. | B60K 11/085 454/155 |
| 2013/0264133 A1 | * | 10/2013 | Remy .................. | B60K 11/085 180/68.1 |
| 2013/0270019 A1 | * | 10/2013 | Kuesperth .............. | B60K 11/08 180/68.1 |

(Continued)

FOREIGN PATENT DOCUMENTS

| JP | H07-173977 A | 7/1995 |
|---|---|---|
| JP | 2010-223150 A | 10/2010 |

(Continued)

*Primary Examiner* — Frank B Vanaman
(74) *Attorney, Agent, or Firm* — Morgan, Lewis & Bockius LLP

(57) ABSTRACT

A vehicular active air flap assembly capable of being opened or closed during a failure may include an air flap that can be manually opened to allow air required during the operation of the vehicle to be supplied into the engine compartment even when the air flap malfunctions, wherein the vehicular active air flap assembly is configured to operate the air flap mounted on a hole formed in a radiator grill to allow cooling air to be supplied into an engine compartment of a vehicle or block the supply of cooling air and wherein the air flap is rotatably coupled at opposite end portions thereof to the radiator grill, and at least one end portion thereof is mounted to be movable in a front-rear direction of the vehicle.

8 Claims, 13 Drawing Sheets

(56) References Cited

U.S. PATENT DOCUMENTS

| | | | | |
|---|---|---|---|---|
| 2014/0084624 A1* | 3/2014 | Kojima | ................ | B60K 11/085 296/180.1 |
| 2014/0194052 A1* | 7/2014 | Asano | .................. | B60K 11/085 454/335 |
| 2014/0284123 A1* | 9/2014 | Bourqui | ............... | B60K 11/085 180/68.1 |

FOREIGN PATENT DOCUMENTS

| JP | 2016-055718 A | 4/2016 |
|---|---|---|
| KR | 10-2011-0022213 A | 3/2011 |
| KR | 10-1272930 B1 | 6/2013 |
| KR | 10-1316368 B1 | 10/2013 |
| KR | 2015-0070769 A | 6/2015 |

* cited by examiner

VEHICULAR ACTIVE AIR FLAP ASSEMBLY CAPABLE OF BEING OPENED OR CLOSED DURING FAILURE

CROSS-REFERENCE TO RELATED APPLICATIONS

The present application claims priority to Korean Patent Application No. 2016-0150187, filed on Nov. 11, 2016, the entire contents of which is incorporated herein for all purposes by this reference.

BACKGROUND OF THE INVENTION

Field of the Invention

Exemplary embodiments of the present invention relate to an active air flap for controlling supply of external air into an engine compartment of a vehicle; and, particularly, to a vehicular active air flap assembly capable of being opened or closed during a failure, which is configured such that the air flap can be manually opened to allow air required during the operation of the vehicle to be supplied into the engine compartment even when the air flap malfunctions.

Description of Related Art

In general, a radiator grill functioning as a passage through which external air for cooling engine coolant is supplied into an engine compartment is mounted on a front surface of a vehicle.

However, because the radiator grill is always in an open state, when the vehicle travels at high speed, high resistance is caused by vehicle-induced wind drawn into the radiator grill. Furthermore, in environmentally-friendly vehicles such as hybrid vehicles, if vehicle-induced wind is drawn into an engine room even when the engine is not in operation, it may act as resistance to movement of the vehicle.

To overcome the above-mentioned problem, as shown in FIG. 1, an air flap 120 is installed so as to selectively close the radiator grill 110.

The air flap 120 includes rotating shafts 122 which are provided on opposite ends of the air flap 120 and inserted into a housing 111 provided in the radiator grill 110, and is provided with a drive motor or the like. Depending on various conditions of the vehicle, the drive motor is operated to rotate the air flap 120 so that the radiator grill 110 is opened or closed by the air flap 120.

However, in the air flap 120 according to the conventional art, each of the rotating shafts 122 is coupled to the housing 111 by a pin joint and thus fixed in the housing 111. Therefore, if an impact is applied to the rotating shaft 122, the rotating shaft 122 may be easily damaged because it cannot absorb the impact. Thereby, the operation of the air flap 120 may become impossible. Furthermore, there is a problem in that even when power to be applied to the drive motor is interrupted, the air flap 120 cannot be operated.

If the air flap 120 cannot be selectively opened or closed, it may be impossible to drive the vehicle. For example, if it becomes impossible to operate the air flap 120 while the radiator grill 110 is closed by the air flap 120, vehicle-induced wind cannot be drawn into the engine room while the vehicle travels. Thereby, the engine coolant cannot be sufficiently cooled, and the engine may be overheated, thus making it impossible for the vehicle to be operated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a vehicular active air flap assembly capable of being opened or closed during a failure, which is configured to allow a radiator grill to be manually opened when an air flap malfunctions.

Another exemplary embodiment of the present invention is directed to a vehicular active air flap assembly capable of being opened or closed during a failure, which is configured to allow the air flap to be returned to its original position by manually manipulating it when the radiator grill is required to be closed.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an exemplary embodiment of the present invention, there is provided a vehicular active air flap assembly capable of being opened or closed during a failure, the vehicular active air flap assembly being configured to operate an air flap mounted on a hole formed in a radiator grill to allow cooling air to be supplied into an engine compartment of a vehicle or block the supply of cooling air, wherein the air flap is rotatably coupled at opposite end portions thereof to the radiator grill, and at least one end portion thereof is mounted to be movable in a front-rear direction of the vehicle.

The air flap may be configured such that one end portion thereof is coupled to the radiator grill by a ball joint and the other end portion thereof is coupled to the radiator grill by a rotation shaft. A flap holder may be mounted on the radiator grill with the rotation shaft rotatably mounted on the flap holder and is configured to allow the rotation shaft to be moved rearward when the air flap is pressed from a front of the vehicle to a rear thereof.

The flap holder may include: a holder body fixed to a predetermined portion of the radiator grill, and having a rotation shaft installation hole formed in a transverse direction of the vehicle so that a portion of the rotation shaft is received in the rotation shaft installation hole; and movable parts rotatably mounted on the holder body and configured to support an external circumferential surface of a portion of the rotation shaft that is not received in the rotation shaft installation hole.

Each of the movable parts may be hinged to the holder body by a connection pin and be elastically supported such that an end portion of the movable part comes into contact with the external circumferential surface of the rotation shaft.

Each of the movable parts may have a U- or V-shaped cross-sectional shape and be configured such that one end portion of an open portion thereof is hinged to the holder body, and the other end portion thereof comes into contact with the external circumferential surface of the rotation shaft.

The movable parts may be arranged in a vertical direction thereof of the vehicle and mounted such that a distance between the movable parts can be reduced.

A reinforcing part for supporting a portion of the rotation shaft may be formed on the end portion of the air flap that is provided with the rotation shaft. A flap returning device may be provided such that a front end portion thereof comes into contact with the reinforcing part and elastically support the reinforcing part toward the front of the vehicle.

The flap returning device may be alternately compressed or extended each time the air flap is pushed from the front of the vehicle toward the rear thereof.

The flap returning device may include: a support plate fixed to a predetermined portion of a vehicle body; a casing having a cylindrical shape and formed on a surface of the support plate that faces the reinforcing part, with a plurality of guides formed at predetermined intervals on an internal surface of the casing at positions adjacent to an end portion of the casing that faces the support plate, the guides having inclined surfaces extending in the same direction; a rotor slidably mounted in the casing and formed in a longitudinal direction, with ribs formed on a circumferential surface of an end portion of the rotor, the ribs each having an inclined surface coming into contact with the inclined surface of the corresponding guide; a slider fitted over a front end portion of the rotor and mounted to pass through a front end portion of the casing so that a front end portion of the slider comes into contact with the reinforcing part, the slider including guide protrusions arranged on a circumferential surface of the slider and configured to slide along grooves formed between the guides, and a wave-shaped guide surface formed on a rear end portion of the slider and coming into contact with front end portions of the ribs; and a spring configured to elastically support the rotor toward the slider.

A contact groove may be formed in the reinforcing part in a circumferential direction of the rotation shaft. A contact protrusion may be provided on the front end portion of the slider and inserted into the contact groove.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
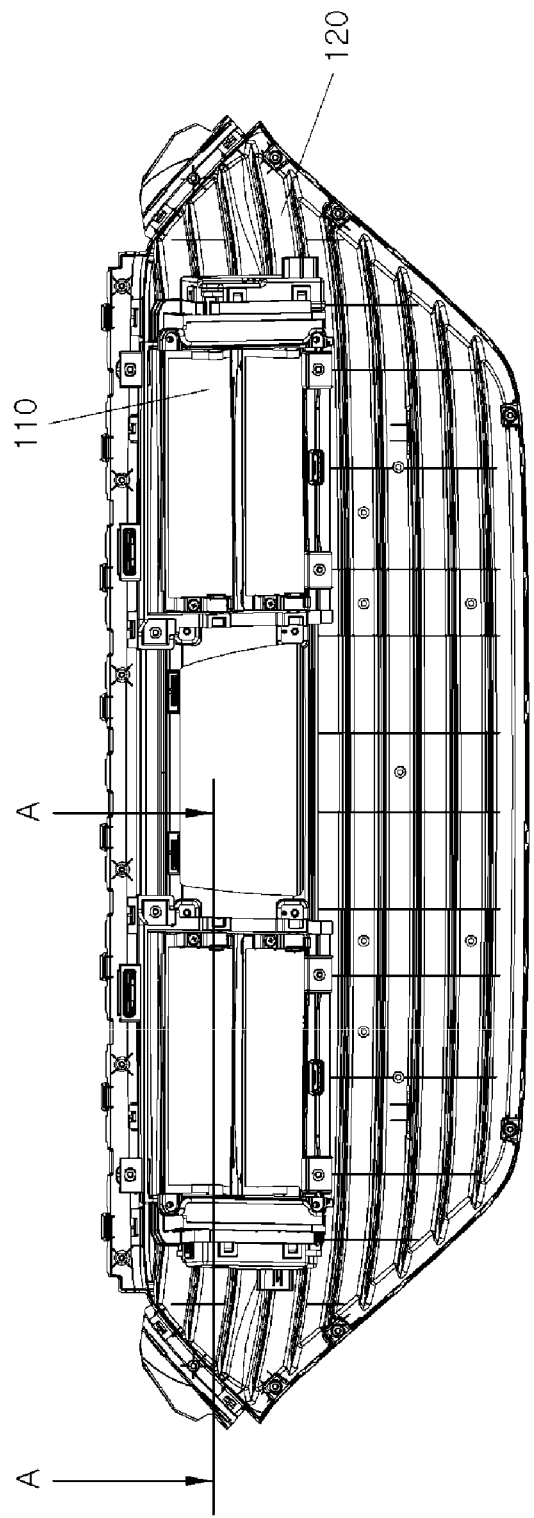
FIG. 1 is a rear view illustrating an active air flap mounted on a radiator grill according to a conventional art.
Figure 2:
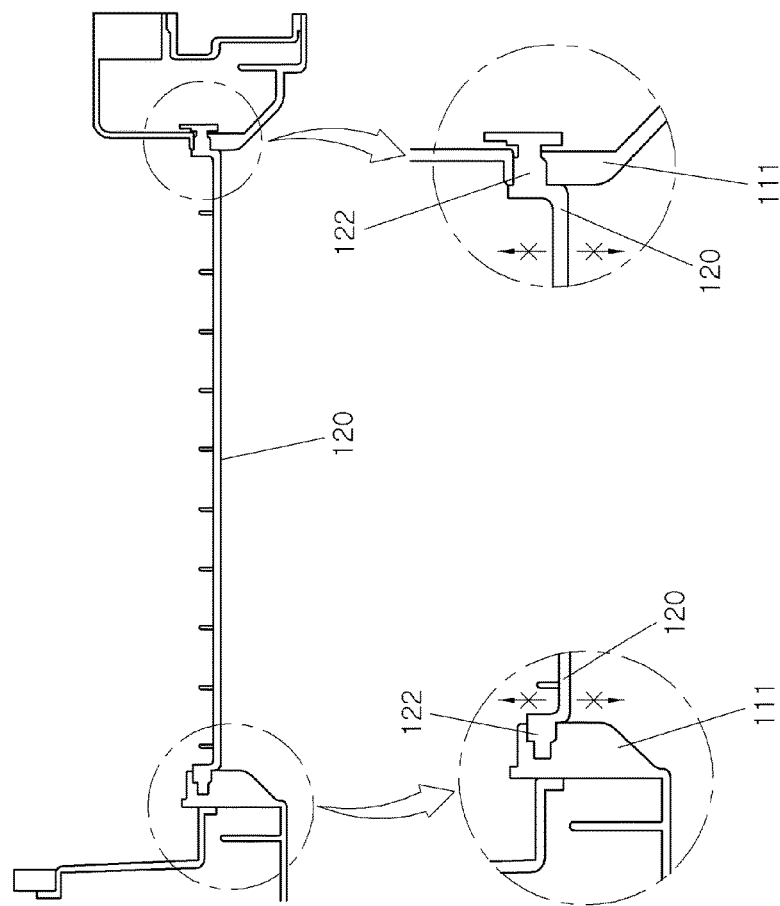
FIG. 2 is a sectional view taken along line A-A of FIG. 1.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will be described below in more detail with reference to the accompanying drawings to be easily realized by those skilled in the art.

The present invention may, however, be embodied in different forms and may not be construed as limited to the embodiments set forth herein. In certain embodiments, irrelevant to the present invention may be omitted to avoid obscuring appreciation of the disclosure. Throughout the disclosure, like reference numerals refer to like parts throughout the various figures and embodiments of the present invention.

The drawings are not necessarily to scale and in some instances, proportions may have been exaggerated to clearly illustrate various layers and regions of the embodiments. It will be understood that when an element including a layer, a film, a region, or a plate is referred to as being "above"

another element, it can be "immediately above" the other element or intervening elements may also be present.

In contrast, when an element is referred to as being "immediately above" another element, there are no intervening elements present. In addition, it will be understood that when an element is referred to as being "entirely" formed on another element, it can be formed on the entire surface (or whole surface) of the other element or cannot be formed at a portion of the edge portion thereof.

Hereinafter, a vehicular active air flap assembly capable of being opened or closed during a failure according to an exemplary embodiment of the present invention will be described in detail with reference to the attached drawings.

The vehicular active air flap assembly capable of being opened or closed during a failure according to an exemplary embodiment of the present invention is configured to operate an air flap which is mounted on a hole formed in a radiator grill to allow cooling air to be supplied into an engine compartment of a vehicle or block supply of cooling air. The air flap 20 is rotatably coupled at opposite end portions thereof to the radiator grill 10, and at least one end portion thereof is mounted to be movable in the front-rear direction of the vehicle.

Accordingly, in an exemplary embodiment of the present invention, one end portion of the air flap 20 is movable in the front-rear direction of the vehicle. Therefore, when the air flap assembly malfunctions, the radiator grill 10 can be opened by temporarily moving the one end portion of the air flap 20 rearward and then manually rotating the air flap 20, thus allowing cooling air to be drawn into the engine compartment, making it possible to drive the vehicle even when the active air flap assembly malfunctions.

The air flap 20 is configured to open or close the through hole formed in the radiator grill 10 of the vehicle. The opposite end portions of the air flap 20 are rotatably mounted on respective predetermined portions of an internal surface of the radiator grill 10. The air flap 20 can be rotated by a separate drive device to open or close the through hole formed in the radiator grill 10. When the vehicle moves at low speed (i.e., a speed lower than a predetermined speed) or using power of a motor, the air flap 20 closes the through hole of the radiator grill 10. When the vehicle move at high speed (i.e., a speed higher than a predetermined speed), the air flap 20 opens the through hole of the radiator grill 10 to allow cooling air to be drawn into the engine compartment to cool coolant heated by the operation of the engine.

The air flap 20 is configured such that, when external force is applied to at least one of the opposite end portions of the air flap 20 in the front-rear direction of the vehicle, the end portion of the air flap 20 can move in the front-rear direction of the vehicle. For example, a first end portion of the air flap 20 may not be moved in the front-rear direction of the vehicle, and a second end portion of the air flap 20 may be mounted to be movable in the front-rear direction of the vehicle.

In the instant case, the first end portion of the air flap 20 is coupled to the radiator grill by a ball joint, and the second end portion of the air flap 20 is mounted on the radiator grill 10 to be movable in the front-rear direction of the vehicle. The second end portion of the air flap 20 is mounted to a flap holder 12, which will be described later herein.

The ball joint 21 is provided on the first end portion of the air flap 20, and the first end portion of the air flap 20 is coupled to the radiator grill 10 in a ball-joint manner by the ball joint 21. The first end portion of the air flap 20 can be freely rotated in various directions.

The second end portion of the air flap 20 is provided with a rotation shaft 22 which extends in a longitudinal direction of the air flap 20 (in a transverse direction of the vehicle). The rotation shaft 22 is mounted in the flap holder 12, which will be described later herein, so that when the second end portion of the air flap 20 is pushed, the second end portion of the air flap 20 is moved in the rear direction of the vehicle.

The flap holder 12 is configured such that the rotation shaft 22 of the air flap 20 is mounted therein and the rotation shaft 22 is movable in the rear direction of the vehicle.

For this, the flap holder 12 includes a holder body 12a which is fixed to the radiator grill 10, and movable parts 12b which are rotatably mounted on the holder body 12a and configured to support an external circumferential surface of the rotation shaft 22 mounted on the holder body 12a.

The holder body 12a is fixed on the radiator grill 10. A rotation shaft installation hole 12a is formed in the holder body 12a so that the rotation shaft 22 is mounted in the rotation shaft installation hole 12aa. The rotation shaft installation hole 12a is formed in a shape in which a portion of the external circumferential surface of the rotation shaft 22 is exposed to the outside. That is, when the rotation shaft 22 is disposed in the rotation shaft installation hole 12aa, a portion of the external circumferential surface of the rotation shaft 22 is exposed.

The movable parts 12b are hinged to the holder body 12a and configured to support the portion of the rotation shaft 22 that is exposed from the rotation shaft installation hole 12aa. Since the movable parts 12b support the external circumferential surface of the rotation shaft 22, the rotation shaft 22 is prevented from being completely removed from the flap holder 12, and the external circumferential surface of the rotation shaft 22 can be supported by the movable parts 12b when the air flap 20 is pushed in the front-rear direction of the vehicle.

A first end portion of each movable part 12b is hinged to the holder body 12a, and a second end portion thereof comes into contact with the external circumferential surface of the rotation shaft 22. The movable part 12b has a U- or V-shaped cross-sectional shape and is configured such that the first end portion of an open portion thereof is hinged to the holder body 12a, and the second end portion thereof makes contact with the external circumferential surface of the rotation shaft 22.

The movable parts 12b are arranged in the vertical direction of the vehicle and are mounted such that the distance between the movable parts 12b can be reduced.

A stop surface 12c and a stop surface 22a which make contact with each other are respectively formed on the movable part 12b and the rotation shaft 22.

A connection pin 12d is mounted to penetrate through both the holder body 12a and each movable part 12b.

In addition, a torsion spring is fitted over the connection pin 12d so that the end portion of the movable part 12b elastically supports the external circumferential surface of the rotation shaft 22. After the torsion spring 35 has been fitted over the connection pin 12d, a first end portion of the torsion spring 35 is fixed to the holder body 12a, and a second end portion thereof is fixed to the movable part 12b such that the end portion of the movable holder body 12b can elastically support the external circumferential surface of the rotation shaft 22.

The air flap 20 includes a flap returning device 30 configured such that when the second end portion of the air flap 20 is pushed once, the second end portion of the air flap 20 is retracted to the rear of the vehicle and maintained in the retracted state, and when the second end portion of the air flap 20 is pushed once more, it returns to its original position.

A reinforcing part 23 for supporting one end portion of the rotation shaft 22 is formed on the second end portion of the air flap 20, i.e., the end portion of the air flap 20 in which the rotation shaft 22 is provided. The flap returning device 30 is configured such that, when the second end portion of the air flap 20 is pushed once while the flap returning device 30 makes contact with the reinforcing part 23, the air flap 20 is maintained in the retracted state, and when the second end portion of the air flap 20 is pushed once more, it returns to its original position. The flap returning device 30 has a structure similar to that of a knock device of a typical knock type ballpoint pen.

The portion of the reinforcing part 23 that makes contact with the flap returning device 30 has a circular arc shape. A contact groove 23a is formed in the reinforcing part 23 to prevent the flap returning device 30 from being undesirably removed from the reinforcing part 23.

The flap returning device 30 has the same structure as that of a knock device of a knock type ballpoint pen, which is configured such that when a button is pushed, a ballpoint pen lead is maintained in an extracted state, and when the button is pushed again, the ballpoint pen lead is retracted into the ballpoint pen body, and every time the button is pushed, the above-mentioned operations are repeatedly performed. Description of the configuration of the knock device of the knock type ballpoint pen will be omitted because it is well known.

The flap returning device 30 includes a support plate 31, a casing 32, a rotor 33, a slider 34 and a spring 35.

The support plate 31 is fixed to a predetermined portion of the vehicle body.

The casing 32 protrudes from a surface of the support plate 31 that faces the air flap 20. The casing 32 has a cylindrical shape. Guides 32a having inclined surfaces extending in the same direction are formed on an internal circumferential surface of a front end portion of the casing 32 at positions adjacent to each other. Grooves extending in the longitudinal direction of the casing 32 may be formed between the guides 32a, and stop parts for filling some of the grooves are formed between the guides 32a. In other words, a structure in which 'guide-groove-guide-stop part' is repeatedly formed is provided on the internal circumferential surface of the casing 32. The inclined surfaces extending in the same direction are formed on the end portions of the respective guides 32a.

The rotor 33 is inserted into the casing 32. The rotor 33 includes ribs 33b each of which protrudes in a radial direction of the rotor 33 and extends in a longitudinal direction of the rotor 33. An inclined surface which makes contact with the inclined surface of the corresponding guide 32a is formed on an end portion of each of the ribs 33b. When the flap returning device 30 is compressed, the front end portions of the ribs 33b are maintained in a state in which they are stopped by the stop parts of the casing 32. On the other hand, when the flap returning device 30 is extended, the front end portions of the ribs 33b are disposed in the grooves of the casing 32 and are elastically supported by the spring 35, which will be explained later herein. Furthermore, when the inclined surfaces formed on the front end portions of the ribs 33b make contact with the inclined surfaces of the guides 32a, the rotor 33 is rotated such that the ribs 33b are alternately disposed in the grooves and on the stop parts.

The slider 34 is inserted into the casing 32. The slider 34 is disposed in the casing 32 and assembled with the rotor 33 in the form in which an insert part 33a provided on the rotor 33 is inserted into the slider 34. The slider 34 is inserted into a front end portion of the casing 32 and mounted to pass through the front end portion of the casing 32 such that a front end portion of the slider 34 makes contact with the reinforcing part 23. Guide protrusions 34b which slide along the grooves formed between the guides 32a are formed on an external surface of the slider 34. A rear end portion of the slider 34 is formed with a wave-shaped guide surface 34c which comes into contact with the front end portions of the ribs 33b.

Furthermore, a contact protrusion 34a which is inserted into the contact groove 23a formed in the reinforcing part 23 is provided on the front end portion of the slider 34.

The operation of the vehicular active air flap assembly according to an exemplary embodiment of the present invention having the above-mentioned configuration will be described below.

When the air flap assembly malfunctions and the air flap 20 cannot open, cooling air is not supplied into the engine compartment, whereby the engine may be overheated. Therefore, in the instant case, the air flap 20 may be manually opened so that cooling air can be supplied into the engine compartment.

Figure 3:
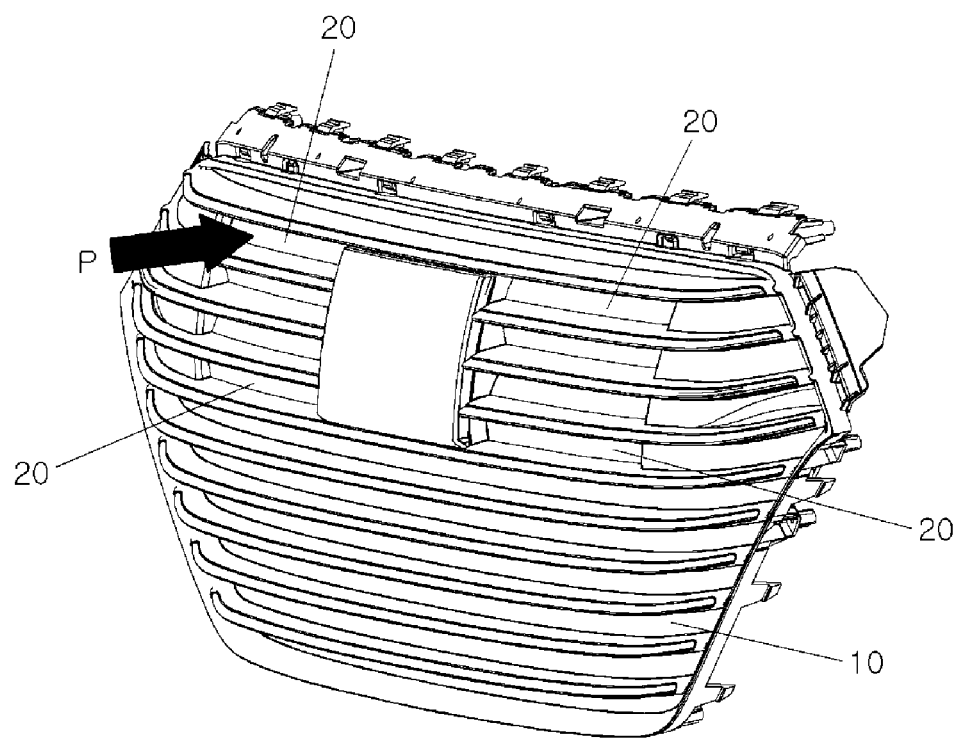
FIG. 3 is a perspective view showing a state in which a vehicular active air flap assembly capable of being opened or closed during a failure according to an exemplary embodiment of the present invention is mounted on a radiator grill.
Figure 4:
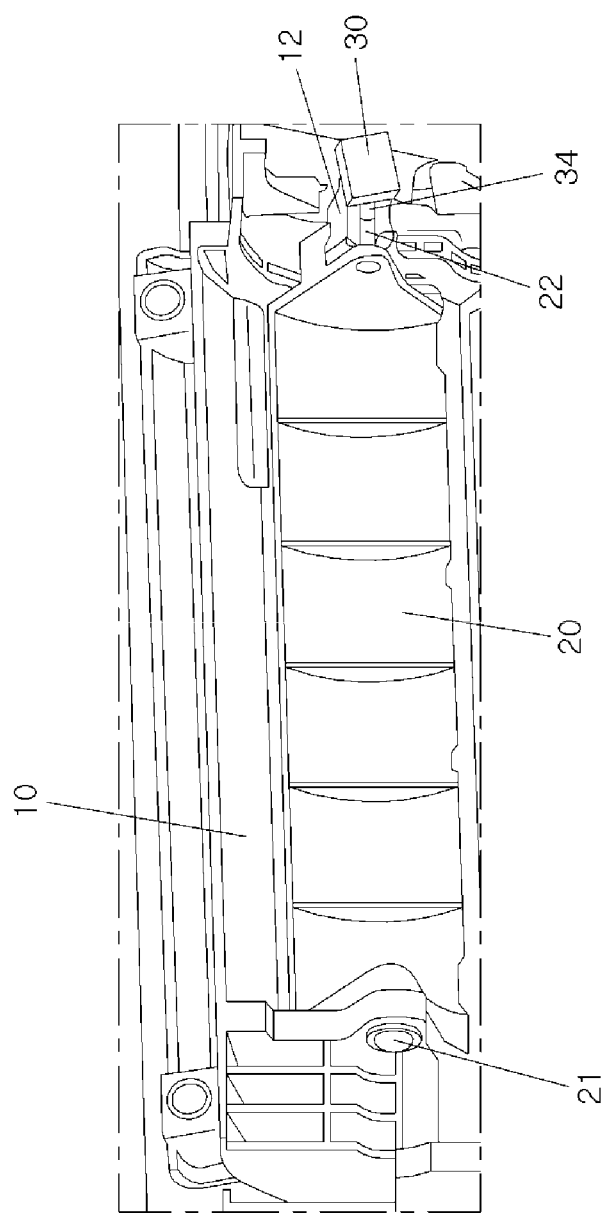
FIG. 4 is a rear perspective view illustrating installation of the vehicular active air flap assembly according to an exemplary embodiment of the present invention.
Figure 5:
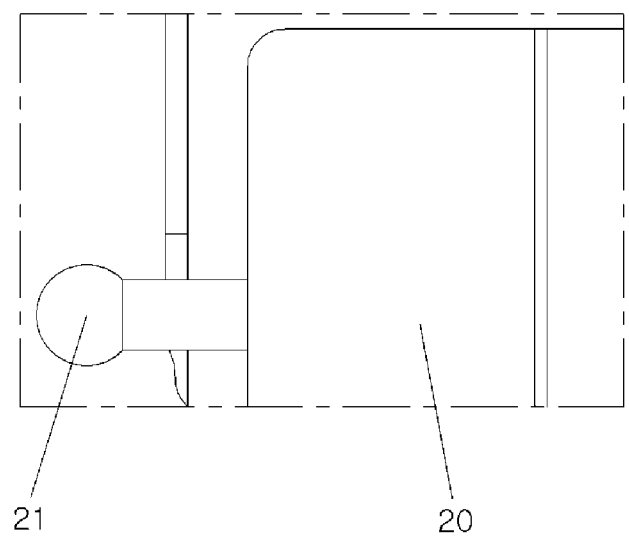
FIG. 5 is a main part enlarged view showing an air flap of the vehicular active air flap assembly according to an exemplary embodiment of the present invention, which is coupled to the radiator grill by a ball joint.
Figure 6:
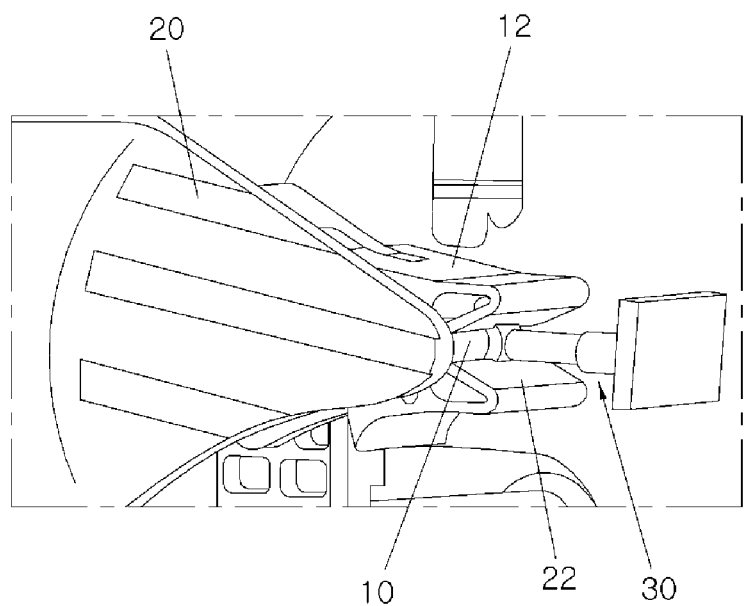
FIG. 6 is a main part enlarged view showing an air flap of the vehicular active air flap assembly according to an exemplary embodiment of the present invention that is coupled to the radiator grill by a rotation shaft.
Figure 7:
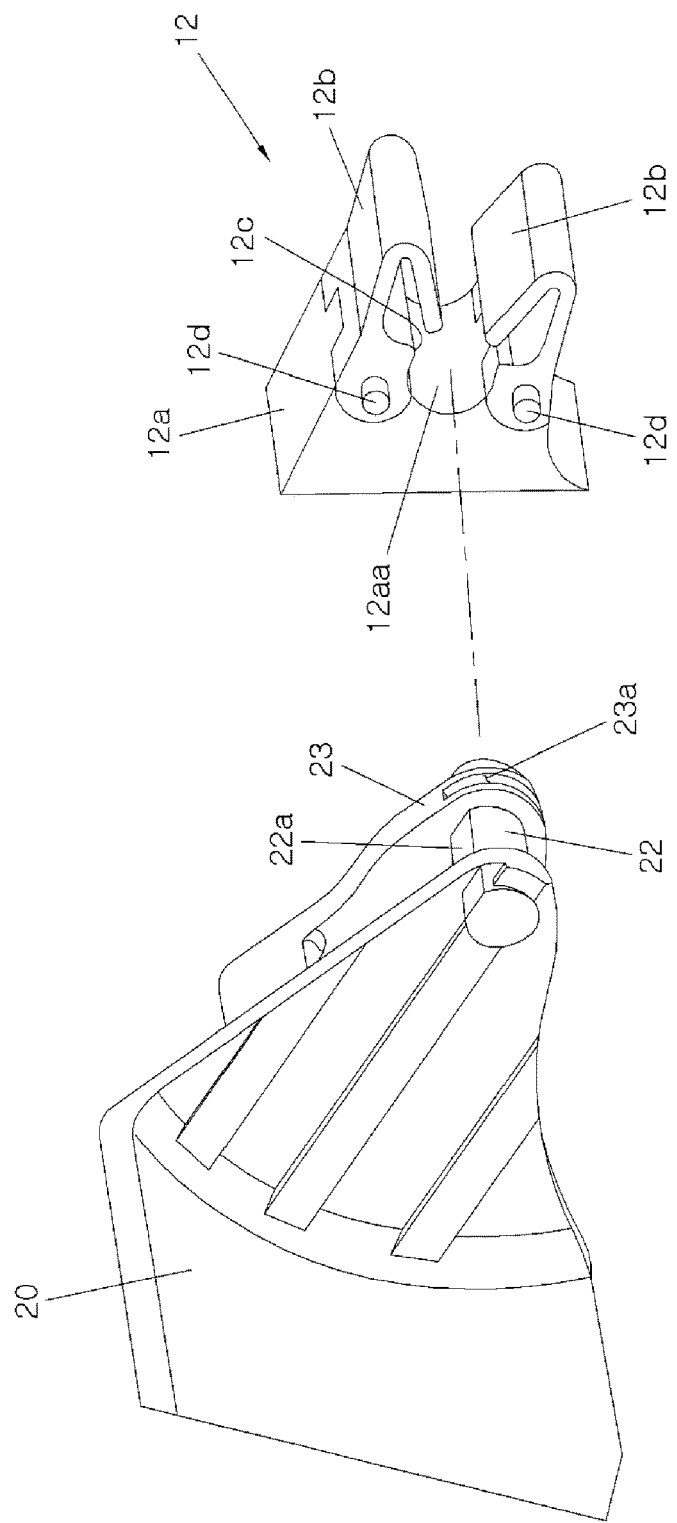
FIG. 7 is an exploded perspective view illustrating the air flap and a flap holder of the vehicular active air flap assembly according to an exemplary embodiment of the present invention.
Figure 8:
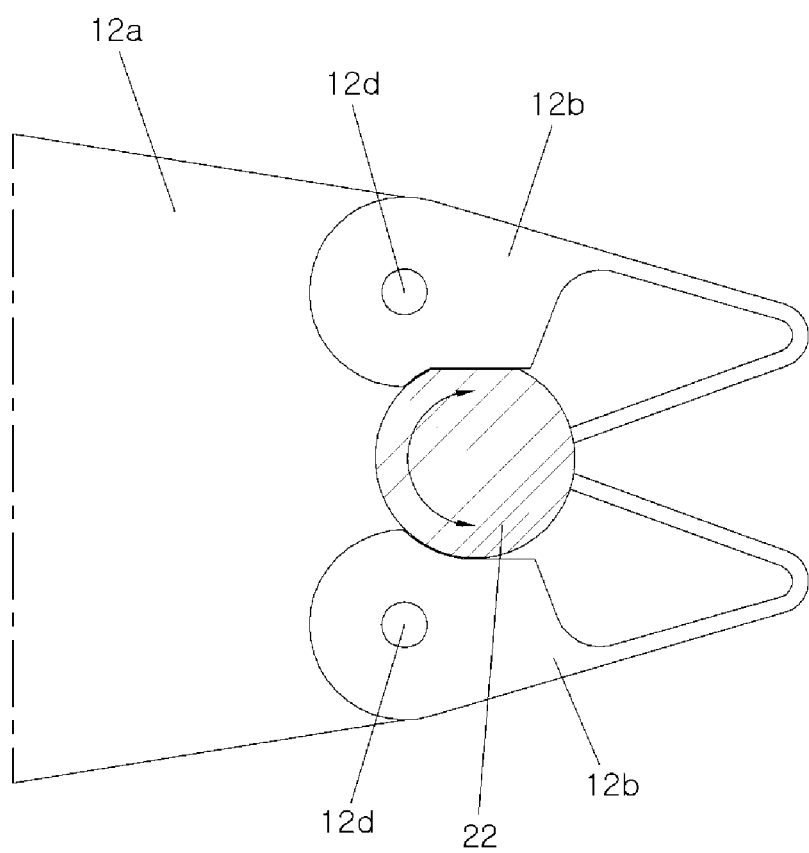
FIG. 8 is a side view illustrating the flap holder of the vehicular active air flap assembly according to an exemplary embodiment of the present invention under normal conditions.

First, the second end portion of the air flap 20 is pushed. As indicated by arrow P of FIG. 3, the external surface of the second end portion of the air flap 20 is pushed.

When the second end portion of the air flap 20 is pushed, the second end portion of the air flap 20 is moved toward the rear of the vehicle. Here, the second end portion of the air flap 20 is moved toward the rear of the vehicle such that it is rotated around the first end portion of the air flap 20. That is, since the first end portion of the air flap 20 is coupled to the radiator grill 11 by the ball joint 21, when the second end portion of the air flap 20 is pushed, the second end portion of the air flap 20 can move toward the rear of the vehicle with the first end portion of the air flap 20 as the center.

Figure 9:
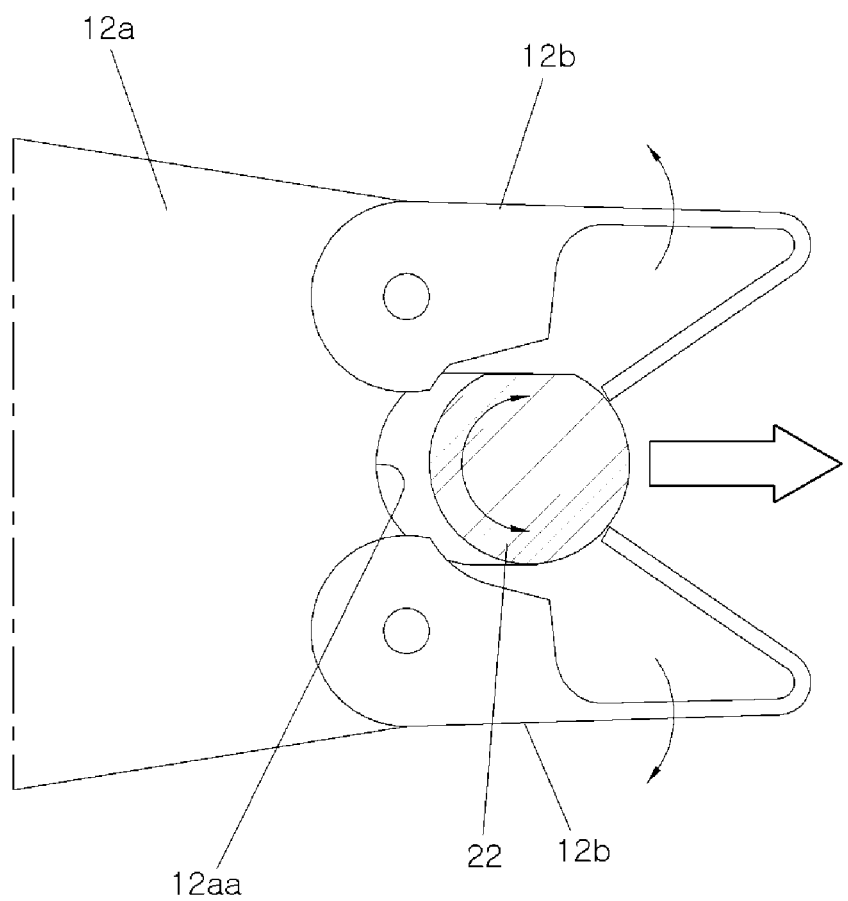
FIG. 9 is a side view illustrating the flap holder of the vehicular active air flap assembly according to an exemplary embodiment of the present invention when the air flap is manipulated under abnormal conditions.
Figure 10:
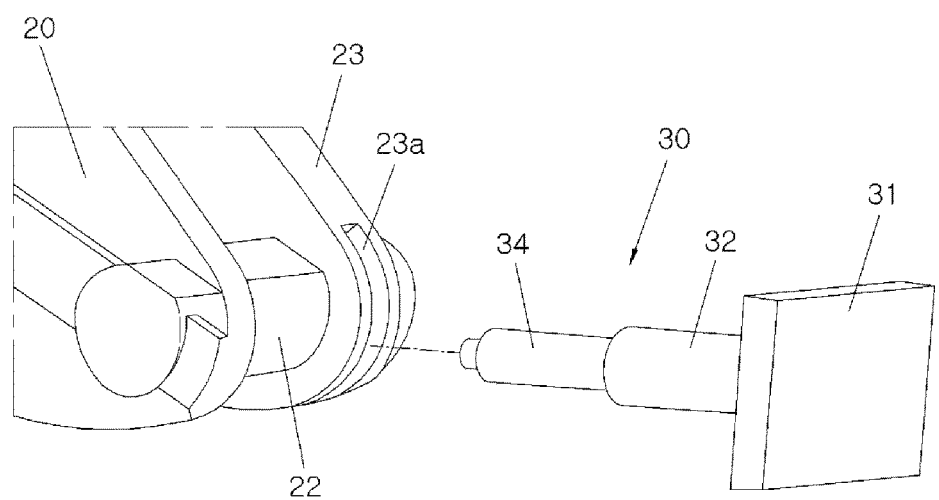
FIG. 10 is an exploded perspective view illustrating the coupling of a flap returning device to the air flap of the vehicular active air flap assembly according to an exemplary embodiment of the present invention under normal conditions.
Figure 11:
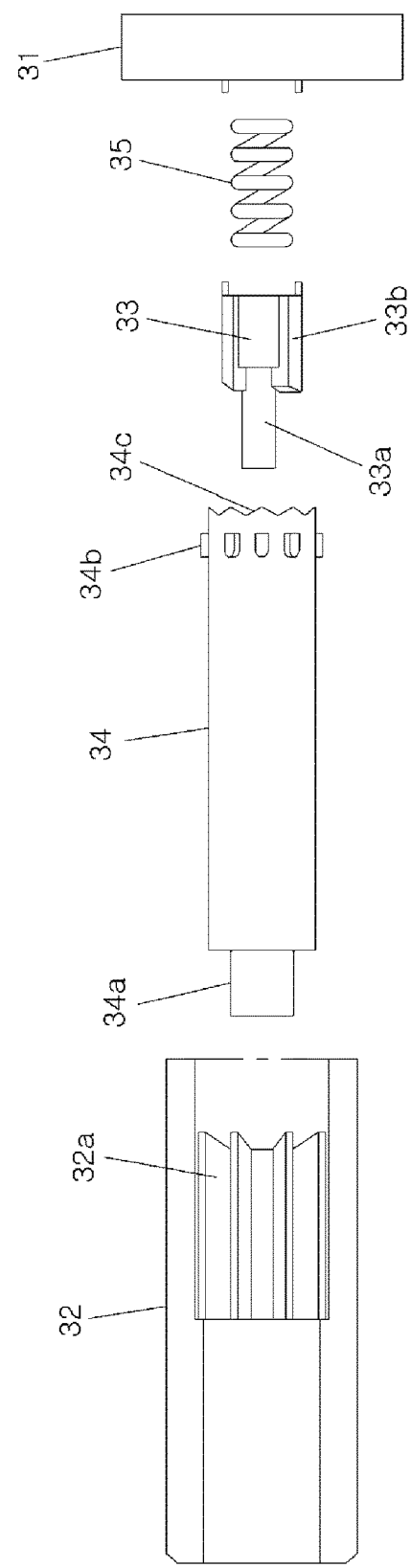
FIG. 11 is an exploded sectional view of the flap returning device of the vehicular active air flap assembly according to an exemplary embodiment of the present invention.
Figure 12:
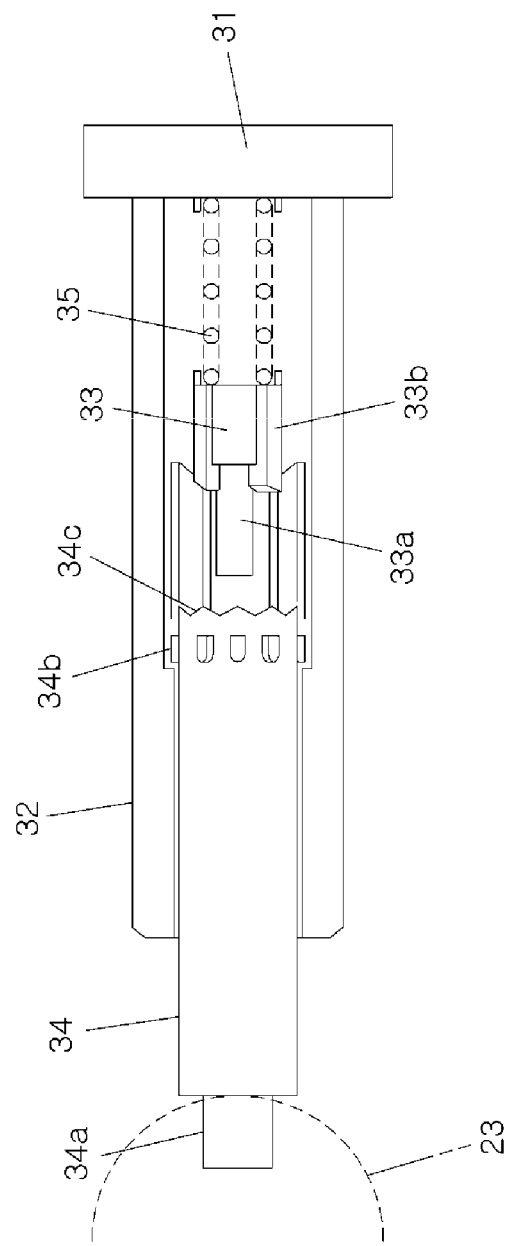
FIG. 12 is a sectional view showing the flap returning device of the vehicular active air flap assembly according to an exemplary embodiment of the present invention under normal conditions.

When the second end portion of the air flap 20 is moved toward the rear of the vehicle, the rotation shaft 22 moves from its original position toward the rear of the vehicle (refer to FIG. 9). Although the rotation shaft 22 is partially removed from the rotation shaft installation hole 12a when the second end portion of the air flap 20 is moved toward the rear of the vehicle, the rotation shaft 22 is prevented from being completely separated from the rotation shaft installation hole 12a because the external circumferential surface of the rotation shaft 22 is supported by the end portions of the movable parts 12b.

Figure 13:
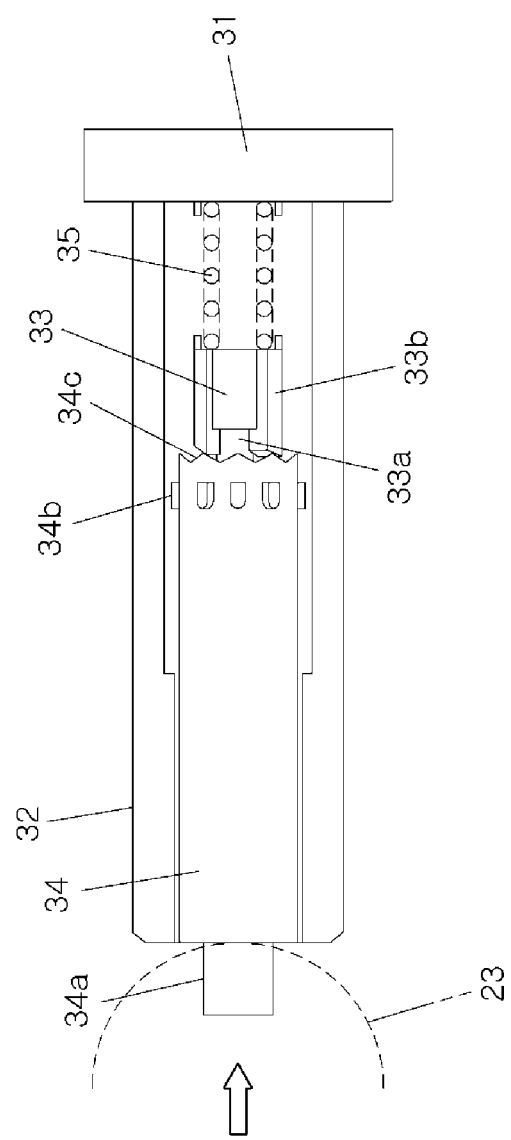
FIG. 13 is a sectional view showing a compressed state of the flap returning device of the vehicular active air flap assembly according to an exemplary embodiment of the present invention under abnormal conditions.

In the instant case, the flap returning device 30 is maintained in the compressed state by the reinforcing part 23 (refer to FIG. 13). That is, because the front end portions of the ribs 33b of the rotor 33 are stopped by stepped portions formed on the respective rear end portions of the guides 32a, the flap returning device 30 is maintained in the compressed state. The flap returning device 30 in the compressed state elastically supports the second end portion of the air flap 20 toward the front of the vehicle.

Accordingly, after the second end portion of the air flap 20 has been moved toward the rear of the vehicle, the air flap 20 is manually rotated so that the through hole formed in the radiator grill 10 opens to allow cooling air to be supplied into the engine compartment. When the air flap 20 is manually rotated, the reinforcing part 23 can be rotated without the reinforcing part 23 and the flap returning device 30 being removed from each other because the contact protrusion 34a is disposed in the contact groove 23a of the reinforcing part 23.

Meanwhile, even in the case where the air flap 20 is returned to its original position, the second end portion of the air flap 20 is pushed again, whereby the air flap 20 can be returned to its original position.

After the air flap 20 has been rotated by a predetermined angle, when the second end portion of the air flap is pushed, the flap returning device 30 is extended again.

In this regard, when the second end portion of the air flap 20 is pushed, the flap returning device 30 is temporarily slightly further compressed compared to that of the state of FIG. 13. In the instant case, the slider 34 pushes the rotor 33. When the rotor 33 is pushed, the front end portions of the ribs 33b of the rotor 33 are removed from the stepped portions formed on the rear end portions of the guide 32a. Then, the inclined surfaces formed on the front end portions of the ribs 33b of the rotor 33 come into contact with the inclined surfaces formed on the end portions of the guides 32a, whereby the rotor 33 is rotated by a predetermined angle. When the rotor 33 rotates, the front end portions of the ribs 33b of the rotor 33 are disposed in the corresponding grooves formed between the guides 32a, and the rotor 33 is moved forward by the elastic force of the spring 35, whereby the flap returning device 30 is extended.

When the flap returning device 30 is extended, the reinforcing part 23 is pushed by the flap returning device 30. As a result, the air flap 20 returns to its original position.

According to a vehicular active air flap assembly capable of being opened or closed during a failure according to an exemplary embodiment of the present invention, the vehicular active air flap assembly is operated such that even when a failure including interruption of power is caused, a radiator grill can be manually opened to enable the vehicle to be operated.

Furthermore, because a rotation shaft is supported in the same manner as a knock device of a knock type ballpoint pen, the air flap can be returned to its original position after the failure has been repaired, thus making it possible for the air flap to be operated normally.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicular active air flap assembly configured for being opened or closed during a failure, the vehicular active air flap assembly being configured to operate an air flap mounted on an opening formed in a radiator grill to allow cooling air to be supplied into an engine compartment of a vehicle or block the supply of the cooling air thereto,
   wherein the air flap is rotatably coupled at opposite end portions thereof to the radiator grill, and a first end portion among the opposite end portions is mounted to be movable in a rearward direction of the vehicle, and
   wherein the first end portion of the air flap is moved in the rearward direction of the vehicle while the air flap is rotated by driver to open the radiator grill during a failure of the air flap,
   wherein the first end portion of the air flap is coupled to the radiator grill by a ball joint and a second end portion among the opposite end portions is coupled to the radiator grill by a rotation shaft,
   wherein a flap holder is mounted on the radiator grill with the rotation shaft rotatably mounted on the flap holder and is configured to allow the rotation shaft to be moved rearward when the air flap is pressed from a front of the vehicle to a rear thereof, and
   wherein the flap holder includes:
      a holder body fixed to a predetermined portion of the radiator grill, and having a rotation shaft installation opening formed in a transverse direction of the vehicle wherein a portion of the rotation shaft is received in the rotation shaft installation opening; and
      movable parts rotatably mounted on the holder body and configured to support an external circumferential surface of a portion of the rotation shaft that is not received in the rotation shaft installation opening.

2. The vehicular active air flap assembly of claim 1, wherein each of the movable parts is hinged to the holder body by a connection pin and is elastically supported, and wherein an end portion of each of the movable parts contacts with the external circumferential surface of the rotation shaft.

3. The vehicular active air flap assembly of claim 2, wherein each of the movable parts has a U- or V-shaped cross-sectional shape and wherein a first end portion of an open portion of the movable parts is hinged to the holder body, and a second end portion of the open portion of the movable parts contacts with the external circumferential surface of the rotation shaft.

4. The vehicular active air flap assembly of claim 2, wherein the movable parts are arranged in a vertical direction of the vehicle and wherein a distance between the movable parts is configured to be reduced.

5. The vehicular active air flap assembly of claim 1, wherein a reinforcing part for supporting a portion of the rotation shaft is formed on an end portion of the air flap that is provided with the rotation shaft, and
   wherein a front end portion of a flap returning device contacts with the reinforcing part and elastically supports the reinforcing part toward a front of the vehicle.

6. The vehicular active air flap assembly of claim 5, wherein the flap returning device is alternately compressed or extended each time the air flap is pushed from the front of the vehicle toward the rear thereof.

7. The vehicular active air flap assembly of claim 6, wherein the flap returning device includes:
   a support plate fixed to a predetermined portion of a vehicle body;
   a casing having a cylindrical shape and formed on a surface of the support plate that faces the reinforcing part, with a plurality of guides formed at predetermined intervals on an internal surface of the casing at positions adjacent to an end portion of the casing that faces the support plate, the guides having inclined surfaces extending in a same direction;

a rotor slidably mounted in the casing and formed in a longitudinal direction thereof, with ribs formed on a circumferential surface of an end portion of the rotor, the ribs each having an inclined surface contacting with the inclined surface of a corresponding guide;

a slider fitted over a front end portion of the rotor and mounted to pass through a front end portion of the casing wherein a front end portion of the slider contacts with the reinforcing part, the slider including guide protrusions arranged on a circumferential surface of the slider and configured to slide along grooves formed between the guides, and a wave-shaped guide surface formed on a rear end portion of the slider and coming into contact with front end portions of the ribs; and an elastic member configured to elastically support the rotor toward the slider.

8. The vehicular active air flap assembly of claim 7, wherein a contact groove is formed in the reinforcing part in a circumferential direction of the rotation shaft, and wherein a contact protrusion is provided on the front end portion of the slider and inserted into the contact groove.

* * * * *